XR 3,778,616

Ranniger

[11] 3,778,616
[45] Dec. 11, 1973

[54] OPTICAL PATH ALIGNMENT INSTRUMENT

[76] Inventor: Don E. Ranniger, 2890 Robb Cir., Denver, Colo. 80215

[22] Filed: May 30, 1972

[21] Appl. No.: 257,858

[52] U.S. Cl. .................................................. 250/199
[51] Int. Cl. ................................................. H04b 9/00
[58] Field of Search...................... 250/199; 356/110, 356/153, 172

[56] References Cited
UNITED STATES PATENTS

| | | | |
|---|---|---|---|
| 2,982,859 | 5/1961 | Steinbrecher | 250/199 |
| 3,466,761 | 9/1969 | Stinchcomb | 250/199 |
| 3,449,577 | 6/1969 | Kogelnik | 250/199 |
| 3,316,800 | 5/1967 | Kibler | 250/199 |
| 2,345,445 | 3/1944 | Atwood | 250/199 |

*Primary Examiner*—Albert J. Mayer
*Attorney*—Richard D. Law

[57] ABSTRACT

A communications system operating in visible or infra red light bands, includes station 1 having a transmitter and station 2 having a receiver, and an alignment instrument utilizing clocked digital data is inserted in the transmitter of station 1 which may be utilized by station 2 to align its receiver to maximum signal. The received signal at station 2 may be fed into an alignment instrument utilizing a pulse generator, and the received signal is used to change the normal duty cycle of the pulse generator to 25 percent on and 75 percent off, and the output of the alignment instrument may be connected to the output of station 2 in loopback. The received signal voltage at station 2 will increase the duty cycle above the 25 percent proportional to the level of the received signal voltage. By transmitting this back to the station 1, its received signal can be increased or decreased by vertical and/or horizontal adjustment of station 1 transmitter.

8 Claims, 6 Drawing Figures

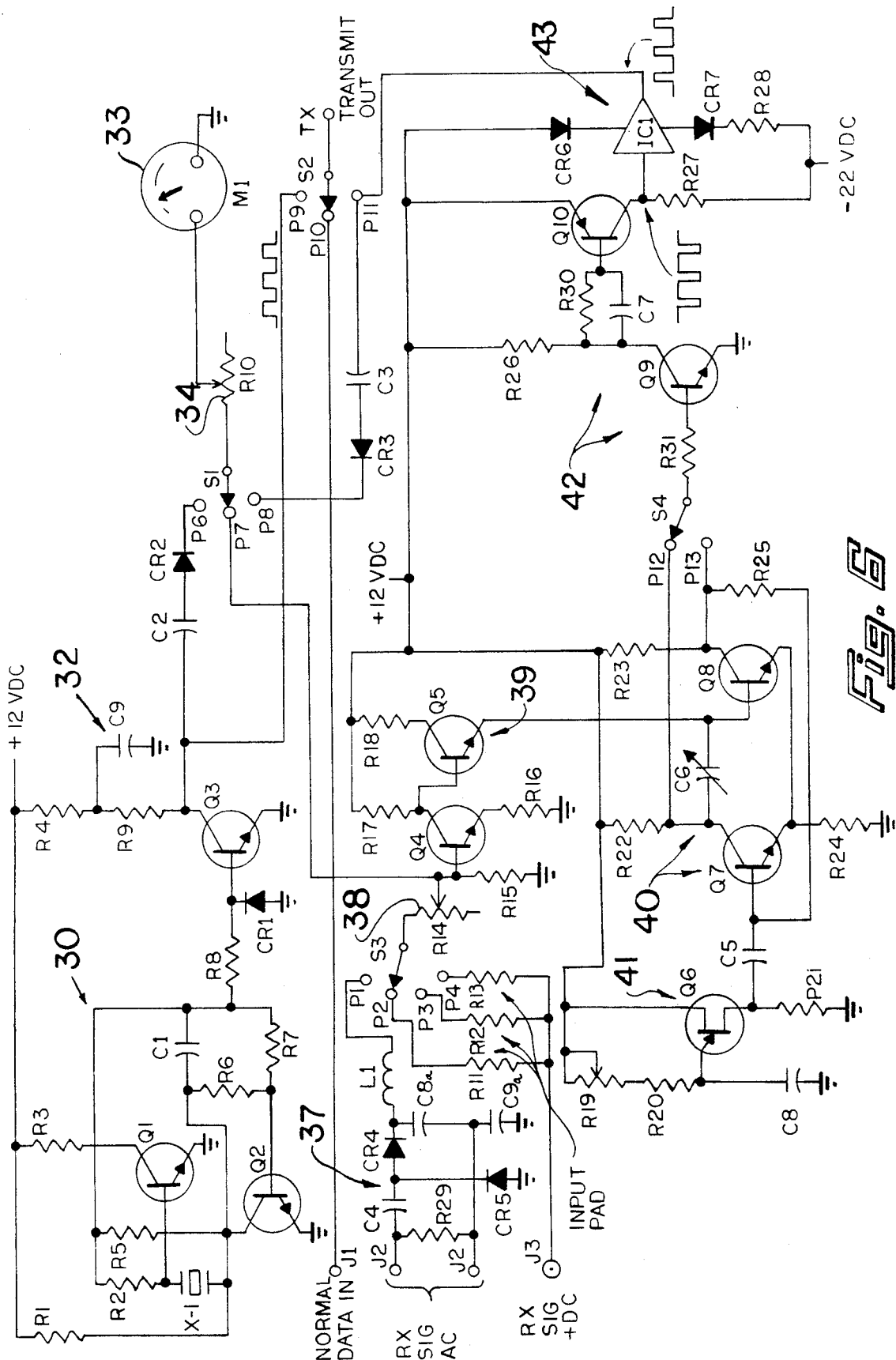

OPTICAL PATH ALIGNMENT INSTRUMENT

The present invention relates to an aligning system for communications system in visual or infra red frequency bands, and provides means for accurately aligning the transmitter and receiver between stations.

The transmission of intelligence, including coded data, in visible light and infra red frequencies is a well known art. The alignment of the transmitter and receiver of a visible light transmission system would appear to be a relatively easy matter, however, there is substantial radiant energy lost as the center of the transmittal beam moves away from a receiver. Particularly with laser beams, the radiant energy beam is quite narrow, and even at relatively short distances from a transmitting station, the receiving station can easily be a substantial lateral distance away from the center of the laser beam at low angles of divergence. Conversely microwave systems have a fairly widely divergent wave with very little loss of intensity from the center to the fringe of the beam, and therefore alignment of transmitters and receivers in the microwave field is not as critical as in the visible light frequency ranges. With such very narrow beams, it is highly important that both the transmitter and the receiver be accurately aligned to prevent an undue radiant energy loss by deviation error or misalignment between the transmitter and the receiver.

It is, therefore, an important object of the invention to provide a system for easy and fast alignment of both a transmitter and receiver of a visible light or infra red frequency communication system.

Another object of the invention is to provide an instrument for signalling alignment of a communications system using a digital clock in the system to provide means for adjustment of an incoming signal to maximum strength.

Still another object of the invention is to provide a system for signalling alignment of communication systems using an asynchronous data set which may be looped back between transmitter and receiver on a compatible communications channel outside of the visible light or infra red frequency system.

These and other objects and advantages of the invention may be readily ascertained by referring to the following description and appended illustrations in which:

FIG. 6 is a typical circuit diagram for an alignment instrument.

In one form of the invention, a communication system using visible or infra red light frequencies, includes two stations in a line of sight configuration and both utilize a transmitter and a receiver for path alignment. At the first station a digital clock is connected to the communications system transmitter thereby keying the transmitter to clock frequency. The clocked digital data transmitted from the first station to the second station may be utilized by the receiving station to align the receiver to the incoming signal, by vertical and/or horizontal adjustment, for maximum received signal. The received signal at the second station is fed into an alignment instrument and the received signal voltage is utilized to change the duty cycle of a pulse generator in the alignment instrument. The normal duty cycle of the clock at the receiving station will be of equal transitions (i.e., 50 percent on 50 percent off) but by looping back the operation of the alignment instrument the test duty cycle of the pulse generator will become 25 percent on and 75 percent off at clock frequency. The output of the alignment instrument is connected to the transmitter of station 2 in loopback. The received signal voltage at the receiving station will increase the duty cycle of the alignment instrument above the 25 percent level proportional to the level of the received signal voltage. This signal is transmitted back to the station number 1 and this received signal can be increased or decreased by the vertical and/or horizontal adjustment of the transmitter at the first station.

In a second form of the invention the incoming signal at the receiver station can be adjusted for a lower frequency operation compatible with an asynchronous data set by looping back through the alignment instrument. The output of the loopback can be fed to a compatible asynchronous data set and looped back to station number 1 via a communication channel (telephone lines, radio, or the like) where the signal is received on another compatible data set. The output of the asynchronous data at the first station may be fed into a volt meter or equivalent monitoring device (oscilloscope, etc.) and the average rectified voltage or displayed signals increasing or decreasing as the transmitter of station 1 is adjusted through its vertical and/or horizontal planes.

Figure 1:
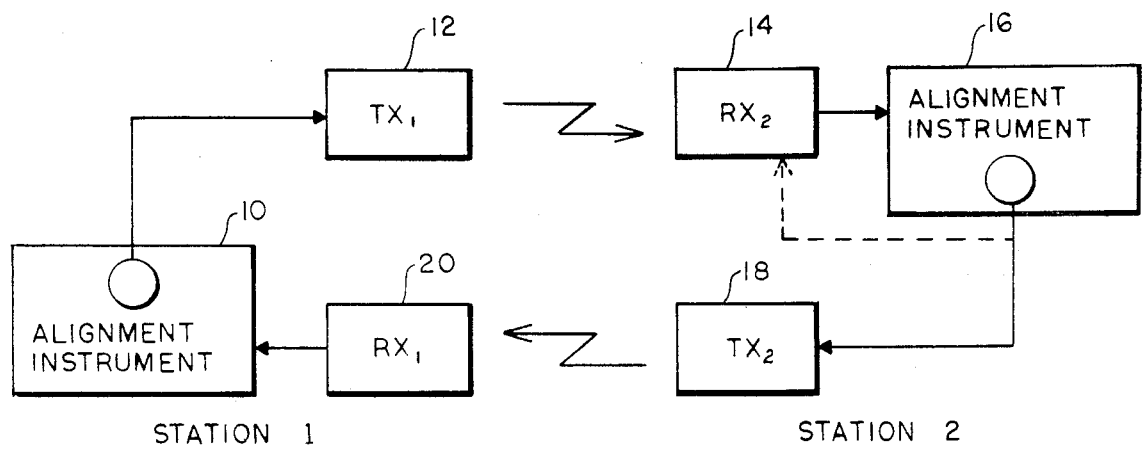
FIG. 1 is a block diagram of a system for aligning a visible light or infra red frequency communications system according to the invention.
Figure 2:
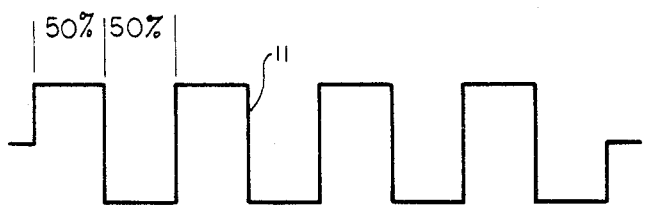
FIG. 2 is a graph of a normal duty cycle of a digital clock.

As shown in FIG. 1, an alignment instrument 10 which includes a digital clock is connected to a communications system transmitter 12, keying the transmitter to the clock frequency, producing a square wave 11 as shown in FIG. 2 which is 50 percent on and 50 percent off. The clock frequency of the alignment instrument 10 operates at frequencies compatible with the band width of the communications system. The signal transmitted from transmitter 12 is received in the receiver 14 at station 2. This clocked digital data can be utilized at station 2 to align the receiver to a maximum received signal by vertical and/or horizontal adjustment of the receiver. Having the receiver in maximum received signal does not guarantee that the transmitter is correctly aligned with the receiver, and the received signal from the receiver 14 is fed into an alignment instrument 16 which has a pulse generator, and the received signal voltage is used to change the duty cycle of the pulse generator in the alignment instrument at station number 2. As with the digital clock of the alignment instrument 10 of the station 1, the normal duty cycle of the pulse generator of station 2 will be equal transitions as indicated in FIG. 2. By changing the alignment instrument to loopback operation at station 2, the test duty cycle of the alignment instrument will become 25 percent on and 75 percent off at the clock frequency. The output of the alignment instrument is connected to the transmitter of station 2 in a loopback system. The received signal voltage at station 2 will increase the alignment instrument duty cycle above 25 percent at the clock frequency proportional to the level of the received signal voltage. The signal from the alignment instrument at station 2 is then fed to a transmitter 18 at station 2 to transmit a signal to receiver 20 at station 1. At station 1 the received signal from station 2 can be increased or decreased by vertical and/or horizontal adjustment of the station 1 transmitter 12.

Figure 4:
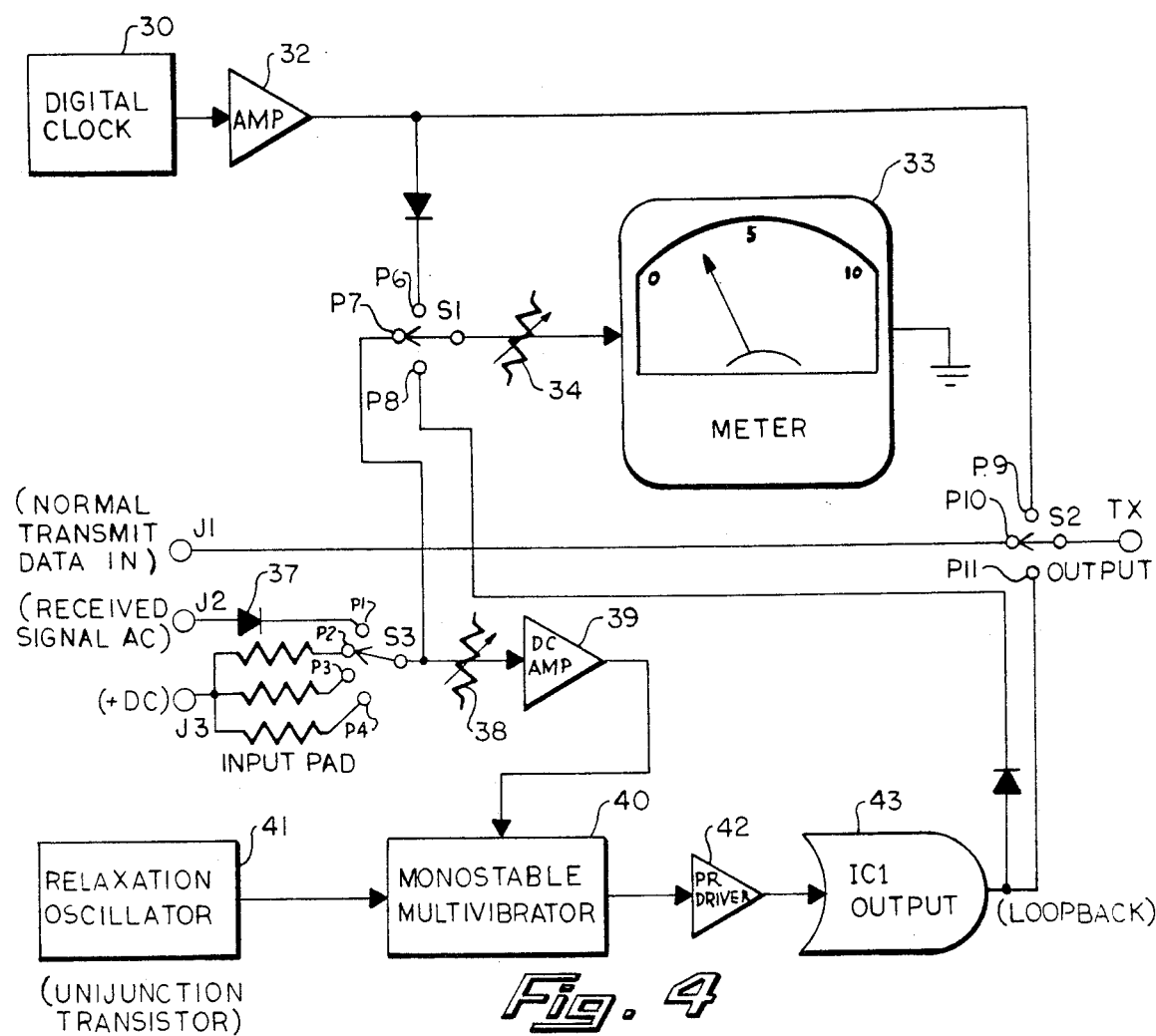
FIG. 4 is a block diagram of an alignment instrument for use with a visible light or infra red frequency communications system.

The test clock portion of the alignment instrument is basically a crystal controlled oscillator. The clock 30 shown in FIG. 4 is coupled to an amplifier 32 and the output of which is a square wave. A switch S-1 allows a selection function for a meter 33 arranged to show signal strength. A variable resistor 34 provides a range adjustment for the meter 33. A received signal is applied through J-2 if it is an AC signal and through J-3 if it is a positive DC signal. Normal transmit data-in is applied through connection J-1 which may be passed on through the transmitter output TX through switch S-2. The AC current through connection J-2 passes through an amplifier or voltage doubler circuit 37 to position P-1 of the switch S-3. A DC received signal entering via connection J-3 passes through one of the resistors of the input pad to positions P-2, P-3 or P-4 of switch 3 depending on level of signal. A variable resistor 38 permits a level adjustment for a voltage amplifier 39 for powering one side of a monostable multivibrator 40. A relaxation oscillator 41, which is a unijunction transistor, charges through a condenser (not shown) forming a positive voltage spike to the monostable multivibrator 40. The signal voltage amplified through the DC amplifier 39 will change the pulse width of the monostable vibrator 40 at the relaxation oscillator frequency. The signal from the multivibrator is passed through a pre-driver to an integrated circuit output 43, and the output of the ICI 43 is inverted from the input. Normally the output of the ICI is ±12 volts DC. The output levels can be changed by reducing or increasing the power supply voltage to the ICI.

Figure 3:
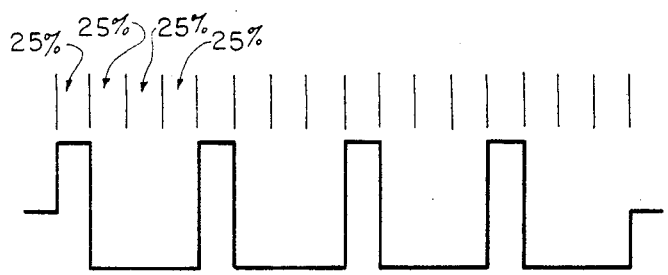
FIG. 3 is a graph of a test duty cycle of a pulse generator looped back into a receiver of a communications system according to the invention.

Switch S-1 permits a selection of function for the meter either from the test clock 30 through position P-6 or looped back from position P-8. The AC or DC input from J-2 or J-3 may be monitored by running directly into the meter through position P-7. The digital clock output may be imposed directly on a transmitter TX through the switch S-2 at position P-9. When the incoming signal is impressed through connection J-1 the normal transmit data may be passed directly through position 10 and switch 2 to the transmitter TX. The alignment provided at station 1 may be the same as at station 2, and the clocked digital data inserted to the transmitter TX. Assuming the alignment instrument is at station 1 the signal received at station 2 can be used to align the receiver to maximum signal. With the alignment instrument at station 2 the received signal is utilized to change the duty cycle of the alignment instrument at station 2. As stated before, the normal duty cycle of the clock will be equal transitions as shown in FIG. 2 in positions where the instrument is 50 percent on and 50 percent off, and by changing the alignment instrument to loopback at station 2 the duty cycle of the alignment instrument will become 25 percent on and 75 percent off at the clock frequency shown in FIG. 3. The output of the alignment instrument will be connected to the output of station 2 at loopback. The received signal voltage at station 2 will increase the alignment instrument duty cycle above the 25 percent of the clock frequency proportional to the level of the received signal voltage. The clock output would then be connected to the transmit through switch 2 for transmit back to station 1. At station 1 the received signal can be increased or decreased by vertical or horizontal adjustment of the transmitter which is transmitting the signal to station 2.

Figure 5:
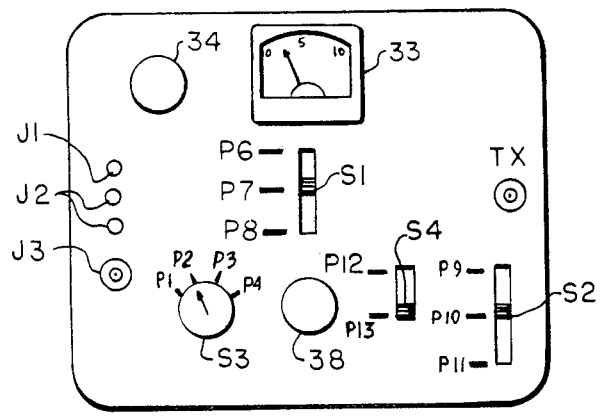
FIG. 5 is a generally schematic view of a panel for the instrument of the invention.

For aligning the transmitter and receiver of the communications system, at the transmit station 1, switch S-1 is moved to P-6 to monitor the output of the digital clock 30, FIG. 4. A typical panel set-up is shown in FIG. 5 with the switch positions indicated. Switch S-2 is moved to position P-9 which connects the output of the clock to transmitter TX, at the receiving station 2, assuming a similar alignment instrument at both stations, its switch 1 is moved to P-7 to monitor DC amplifier 39. Switch S3 is moved to P2, if received signal 13 AC or to P-2, P-3 or P-4 if the signal is DC, and position is determined by level of signal. For loopback at station 2, switch S-2 is moved to position P-11, connecting output of the pulse generator to the transmit line. Switch S-1 is moved to P-8 to monitor output level of the pulse generator. Switch S-3 is moved to applicable position depending on the received signal. For normal transmit switch S-2 is moved to position P-10, allowing normal transmitted data to be applied to the transmitter.

A typical circuit diagram of an alignment instrument is shown in FIG. 5, which is intended only to illustrate one way of providing clocked digital data for alignment purposes. The test clock position consists of solid state transistors Q-1, Q-2, and Q-3, forming a basically crystal controlled oscillator, capacitor coupled to condenser C-1, to an output shaper and amplifier CR-1 and Q-3. The voltage double circuit 37 includes CR-4, CR-5, C-8 and C-9. Resistor R-14 (38) permits a level adjustment of voltage amplifiers Q-4 and Q-5.

The relaxation oscillator includes unijunction transistor Q-6. Resistors R-19 and R-2 charge condenser C-8 until the voltage reaches $V_p$ level, and C-8 discharges through resistor R-21 forming a positive voltage spike. When the monostable multivibrator 40 (including Q-7 and Q-8) is in normal state, Q-7 is off and Q-8 is biased through R-18 and Q-5. Q-6 is then charged to about 12 volts, when the relaxation oscillator 41 fires, the positive spike from Q-6, coupled through C-5, turns on Q-7. The voltage across Q-6 will then reverse bias the base of Q-8, turning it off. Q-8 remains off until C-6 charges through resistor R-18 and Q-5 to the voltage across R-24 plus the $V_{BC}$ of Q-8. Signal voltage amplified through Q-4 will be applied to Q-5. The voltage drop through Q-5 will change the pulse-width of the monostable multivibrator at the relaxation oscillator frequency. Switch S-4 can be used to invert the output pulse. The pre-driver transistors Q-9 and Q-10 are normally off with switch S-4 in P-12 position. The output from the ICI is inverted for the input, and is about ±12 VDC.

I claim:

1. Alignment system for transmitters and receivers in communication systems for visible and infra red frequencies comprising means for impressing a pulsed signal in a transmitter at a first station to produce a square wave; means at a second station for monitoring an incoming signal, through a receiver, whereby said receiver may be adjusted for maximum signal input; means for impressing an incoming signal from said receiver at said second station to an impulse generator to thereby alter its duty cycle; means for looping back the signal from said pulse generator to said first station; and means for monitoring said received signal at said first station, whereby movement of said transmitter at said first station may be adjusted for maximum signal received at said second station.

2. An alignment system according to claim 1 wherein said means for impressing a pulsed signal at said first station is a digital clock.

3. An alignment system according to claim 1 wherein said means for looping back is a transmitter for the visible and infra red frequencies.

4. An alignment system according to claim 1 wherein said means for looping back is compatible system separate from the communication system, and said means for monitoring a signal from said second station at said first station is compatible with said compatible system.

5. An alignment system according to claim 1 wherein said first and second stations include a transmitter and a receiver for the frequency of the system, and said means for impressing a pulsed signal at each station are similar.

6. An alignment system according to claim 5 wherein said monitoring means is a voltage meter.

7. An alignment system according to claim 5 wherein the adjustment of said transmitter at said first station and said receiver at said second station is a manual adjustment.

8. An alignment instrument according to claim 1 wherein said means for impressing pulsed signals may be switched out of the system, and said impulse generator at said second station may be switched out of the system.

* * * * *